(12) United States Patent
McGowan et al.

(10) Patent No.: US 10,644,813 B2
(45) Date of Patent: May 5, 2020

(54) ANTENNA ARRAY CALIBRATION METHOD AND APPARATUS

(71) Applicant: Telefonaktiebolaget LM Ericsson (publ), Stockholm (SE)

(72) Inventors: Neil McGowan, Stittsville (CA); Slim Ben Ghalba, Kanata (CA); Marthinus Willem Da Silveira, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/083,968

(22) PCT Filed: Mar. 11, 2016

(86) PCT No.: PCT/IB2016/051414
§ 371 (c)(1),
(2) Date: Sep. 11, 2018

(87) PCT Pub. No.: WO2017/153814
PCT Pub. Date: Sep. 14, 2017

(65) Prior Publication Data
US 2019/0319719 A1    Oct. 17, 2019

(51) Int. Cl.
*H04L 25/03* (2006.01)
*H04B 17/12* (2015.01)
*H01Q 3/40* (2006.01)

(52) U.S. Cl.
CPC .............. *H04B 17/12* (2015.01); *H01Q 3/40* (2013.01); *H04L 25/03949* (2013.01)

(58) Field of Classification Search
CPC .................. H04L 25/03949; H04B 17/12
See application file for complete search history.

(56) References Cited

U.S. PATENT DOCUMENTS

| | | | |
|---|---|---|---|
| 7,795,937 B2 * | 9/2010 | Smith | H03L 7/07 327/149 |
| 9,094,254 B2 | 7/2015 | Da Silveira et al. | |
| 9,917,714 B2 * | 3/2018 | Mayo | H01Q 3/26 |

(Continued)

OTHER PUBLICATIONS

International Search Report and Written Opinion of the International Searching Authority dated Nov. 11, 2016 issued in corresponding PCT Application Serial No. PCT/IB2016/051414, consisting of 11 pages.

*Primary Examiner* — Rasheed Gidado
(74) *Attorney, Agent, or Firm* — Sage Patent Group

(57) ABSTRACT

A method and system for time domain calibration to compensate for signal phase impairment in transmit paths in a transmitter configured to drive an antenna array are disclosed. According to one aspect, a base station is configured to compensate for signal impairment in transmit paths feeding an array of antenna elements in which the compensation is performed in the time domain. The base station includes a combiner configured to combine signals output from the transmit paths to form a feedback signal. An impairment estimator is configured to receive the feedback signal and outbound traffic signals and to determine a phase compensation value for each impairment path. A multiplier is provided for each transmit path, the multipliers configured to multiply the outbound traffic signals by respective phase compensation values.

22 Claims, 7 Drawing Sheets

(56) References Cited

U.S. PATENT DOCUMENTS

| | | | | |
|---|---|---|---|---|
| 2013/0207843 A1* | 8/2013 | McGowan | ............... | H01Q 3/40 342/373 |
| 2014/0133470 A1* | 5/2014 | McGowan | .......... | H04W 72/082 370/336 |
| 2014/0133543 A1* | 5/2014 | Da Silveira | ....... | H04L 25/03949 375/232 |

* cited by examiner

ANTENNA ARRAY CALIBRATION METHOD AND APPARATUS

CROSS-REFERENCE TO RELATED APPLICATIONS

This application is a Submission Under 35 U.S.C. § 371 for U.S. National Stage Patent Application of International Application No.: PCT/IB2016/051414, filed Mar. 11, 2016 entitled "ANTENNA ARRAY CALIBRATION METHOD AND APPARATUS," the entirety of which is incorporated herein by reference.

TECHNICAL FIELD

Wireless communication and in particular, phase impairment compensation in a radio transmitter having an antenna array.

BACKGROUND

Antenna arrays have been widely used in wireless mobile networks for directional signal transmission and reception with an increased gain compared to an omni-directional antenna. The increased gain translates into a higher cell density and data throughput. An antenna array needs to be calibrated across its sub-array paths to remove any linear phase and/or amplitude distortions (hereafter simply referred to as phase distortion) in these paths. If the transmission beam pattern is out of phase or otherwise phase-distorted, the signal transmitted by a base station at normal transmission power may not be correctly received and decoded by a wireless device. To compensate for the phase distortions, the base station may transmit data at a higher power level. However, increasing the transmission power acts as a load to the system, causing a reduction to the power that can be allocated to other wireless devices. In addition, the signal transmitted at higher power may interfere with other wireless devices, causing a reduction in signal quality.

One existing method for antenna array calibration uses special calibration signals injected into the transmit path of the base station. The special calibration signals may interrupt and/or degrade the normal outbound traffic signals, which can negatively impact the network capacity and data throughput. Additionally, there are currently a wide variety of base stations that have different system configurations with multiple standards and multiple carriers. The use of the special calibration signals by these base stations may result in standards non-compliance and/or violate regulatory requirements.

Further, phase variations, such as distortions, may be caused by impairments introduced by use of separate timing or clock components in each of different transmit chains, for example different radio frequency local oscillators, voltage controlled crystal oscillators, clock recovery phased locked loops, etc. The rapid nature of these impairments require correction at a fast rate, a requirement conventional solutions cannot easily meet because of their complexity and processing requirements.

SUMMARY

Some embodiments advantageously provide a method and system for time domain calibration to compensate for signal phase impairment in transmit paths in a transmitter configured to drive an antenna array. According to one aspect, a method includes receiving a feedback signal formed from a combination of a plurality of outbound signals couple-able to a plurality of antenna ports. The method also includes capturing at least one outbound signal as a reference signal before the at least one outbound signal is input to a transmit path. An impairment estimate is performed based on the at least one reference signal and the feedback signal. A phase compensation is determined from the impairment estimate for each of the at least one outbound traffic signal. The method also includes applying the phase compensation to a respective one of the at least one outbound traffic signal before the at least one outbound traffic signal is input to the transmit path and before the at least one outbound traffic signal is captured to form the at least one reference signal.

According to this aspect, in some embodiments, performing the impairment estimate includes computing a pseudo-inverse of a matrix whose elements are based on the at least one reference signal to produce an impairment vector, H, the impairment vector H usable to determine the phase compensation. In some embodiments, performing the impairment estimate includes implementing a conjugate gradient method to produce an impairment vector, H, the impairment vector H usable to determine the phase impairment compensation. In some embodiments, deriving the phase compensation includes computing a phase of each element of an impairment vector, H, the impairment vector H usable to determine the phase compensation. In some embodiments, deriving the phase compensation includes computing an average of the computed phases of elements of the impairment vector, H. In some embodiments, the phase compensation is applied by complex multiplication. In some embodiments, the method further includes detecting a correlation between reference signals and conditioning the outbound traffic signals when the correlation exceeds a correlation threshold. In some embodiments, applying the phase compensation is performed after the conditioning and before detecting the correlation. In some embodiments, the steps of capturing, performing, deriving and applying are performed in a radio unit of a base station. In some embodiments, the method further includes estimating an impairment impulse response in each transmit path; and performing a convolution of a reference signal with the estimated impairment impulse of a corresponding transmit path response to reduce a non-linear phase response. In some embodiments, the method further includes estimating an impairment impulse response and performing a convolution of a feedback signal with an inverse of the estimated impairment impulse response to reduce a non-linear phase response.

According to another aspect, one embodiment is a transmitter configured to compensate for signal phase impairment in transmit paths of the transmitter that couple outbound traffic signals to antennas of an antenna array in which the compensation is performed in the time domain. The transmitter includes a plurality of transmit paths, each transmit path coupling an outbound traffic signal to a port of an antenna element of the antenna array. A combiner is configured to combine signals output from the transmit paths to form a feedback signal. An impairment estimator is configured to produce a phase compensation value based on at least one reference signal and the feedback signal, the at least one reference signal being an outbound traffic signal after being multiplied by the phase compensation value. At least one multiplier is configured to multiply each of at least one outbound traffic signal by a phase compensation value before the at least one outbound traffic signal is coupled to a respective transmit path.

According to this aspect, in some embodiments, the impairment estimator computes a pseudoinverse of a matrix whose elements are based on the at least one reference signal to produce an impairment vector, H, the impairment vector H usable to determine the phase compensation value. In some embodiments, the impairment estimator implements a conjugate gradient method to produce an impairment vector, H, the impairment vector H usable to determine the phase compensation value. In some embodiments, producing a phase compensation value includes computing a phase of an element of an impairment vector, H, the impairment vector H usable to determine the phase compensation value. In some embodiments, the transmitter further includes a correlator configured to detect a correlation between reference signals and a conditioner configured to condition the outbound traffic signals when the correlation exceeds a correlation threshold. In some embodiments, the multiplication of a reference signal by a phase compensation value occurs after the conditioning but before the detecting.

According to yet another aspect, a base station is configured to compensate for signal impairment in transmit paths feeding an array of antenna elements in which the compensation is performed in the time domain. The base station includes a combiner configured to combine signals output from the transmit paths to form a feedback signal. An impairment estimator is configured to receive the feedback signal and outbound traffic signals and to determine a phase compensation value for each impairment path. A multiplier is provided for each transmit path, the multipliers configured to multiply the outbound traffic signals by respective phase compensation values.

According to this aspect, in some embodiments, the multiplication occurs before the outbound traffic signals are received by the impairment estimator. In some embodiments, the impairment estimator computes a pseudoinverse of a matrix whose elements are based on the at least one reference signal to produce an impairment vector, H, the impairment vector H usable to determine the phase compensation value. In some embodiments, the impairment estimator implements a conjugate gradient method to produce an impairment vector, H, the impairment vector H usable to determine the phase compensation value. In some embodiments, producing a phase compensation value includes computing a phase of an element of an impairment vector, H, the impairment vector H usable to determine the phase compensation value. In some embodiments, the base station further includes a correlator configured to detect a correlation between reference signals and a conditioner configured to condition the outbound traffic signals when the correlation exceeds a correlation threshold. In some embodiments, the multiplication of a reference signal by a phase compensation value occurs after the conditioning but before the detecting.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
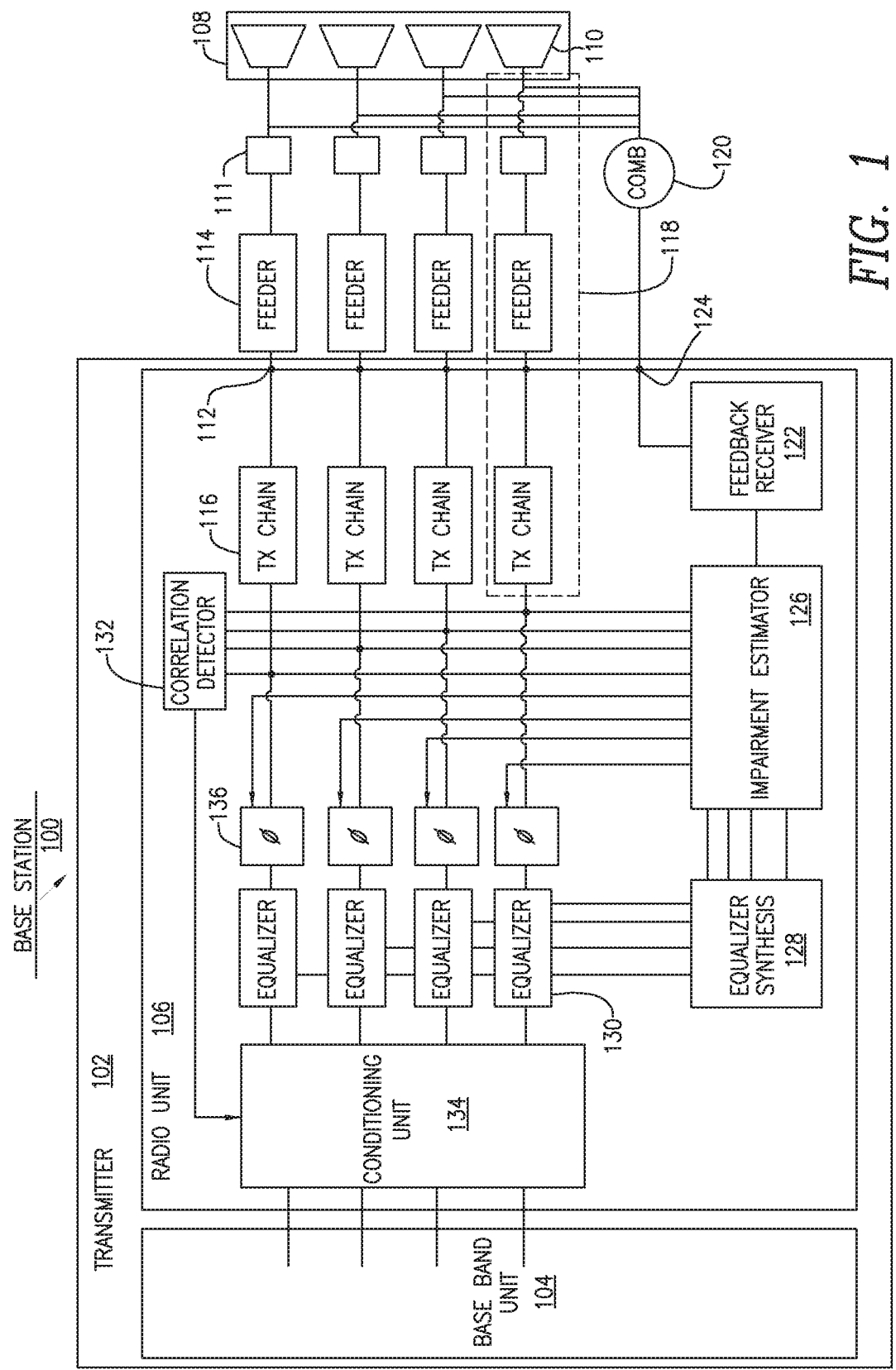
FIG. 1 is a block diagram of a transmitter constructed in accordance with principles described herein for phase impairment compensation for transmit paths that feed an antenna array.

Before describing in detail exemplary embodiments, it is noted that the embodiments reside primarily in combinations of apparatus components and processing steps related to phase impairment compensation in a radio transmitter having an antenna array. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide for an antenna array calibration method that uses normal outbound traffic signals for calibration. The term "outbound traffic signals," as used herein, refers to the traffic signals that are to be transmitted from the antenna array to other network nodes or wireless devices. As used herein, the term wireless device includes at least user equipment, mobile phone, cell phone, laptop, i-pad, or other mobile device. The method described herein calibrates the antenna array in the transmit direction. The method does not use any special calibration signal injected into the base station. As normal outbound traffic signals are used for calibration, the calibration does not interrupt or interfere with the ongoing traffic signals, and therefore does not impact system availability and signal quality. In addition, as the calibration does not incur interruption of normal system operation, the calibration can be performed at all times to account for changes in operating conditions such as temperature changes.

In one embodiment, the calibration can be performed entirely within the radio unit of a base station using the feedback signal from the antenna module, without involving other parts of the base station and the network. Confining the calibration within the radio unit can simplify the hardware and software design and lower the cost of the system as compared with known systems. Moreover, the radio unit in a base station is typically multi-standard, which also means that the radio unit is agnostic to the specific radio standard (i.e., Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. However, it is to be appreciated that embodiments are not so limited.

In some embodiments, the calibration can be performed by the radio unit and other parts of the base station, such as the baseband unit. However, the digital circuitry in the baseband unit is generally multi-standard in hardware, but typically uses software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit. The calibration method described herein may be implemented in both time division duplex (TDD) and frequency division duplex (FDD) systems.

According to one embodiment, the antenna array described herein combines outbound traffic signals to form a feedback signal. The feedback signal is de-convolved with a set of reference signals, which are outbound traffic signals captured before they enter the transmit paths. The correlation between the outbound traffic signals is detected. If the correlation exceeds a correlation threshold, the outbound traffic signals are conditioned by slight phase and/or amplitude variations as a function of time to reduce the correlation.

FIG. 1 illustrates a diagram of a base station 100 with a portion of a transmitter module 102 that performs antenna array calibration according to one embodiment. The portions of the base station 100 and the transmitter module 102 not shown and not described, e.g., amplifiers, transmit controllers, etc., are not relevant to the disclosure. Only those elements needed for an understanding of the concepts disclosed herein are included in FIG. 1. In this embodiment, the transmitter module 102 includes a base band unit 104 and a radio unit 106 communicatively coupled to an antenna array 108 that has multiple sub-arrays 110. Although four sub-arrays 110 are shown in this embodiment, it is understood that any number of sub-arrays may be used. The four sub-arrays 110 carry four corresponding outbound traffic signals that have been phase-controlled for transmission. Each of the outbound traffic signals is a "normal traffic signal" as the signal carries data or other communication information for transmission to another network node or wireless devices. The sub-arrays 110 are coupled to the radio unit 106 of the base station 100 corresponding radio transmit ports 112 at the radio unit 106.

In operation, the transmitter module 102 is configured to take information to be communicated to a wireless device, modulate this information onto a signal, upconvert the information-signal to radio frequency (RF) carriers and transmit the RF signals to antennas to be radiated into space. The baseband unit 104 is configured to modulate in the digital domain to form outbound signals to be sent to the radio unit 106. The radio unit 106 is configured to upconvert the information-carrying signals to RF carriers, predistort and amplify the signals to be transmitted. The antenna array 108 radiates the information-carrying RF signals into the air.

Between the antenna ports 111 and the radio transmit ports 112 are multiple feeders 114, one for each transmit path 118. The term "transmit path" as used herein refers to the path traversed by an outbound traffic signal after the signal enters a transmit (Tx) chain 116 and before the signal enters a sub-array 110. An example of a transmit path is shown in FIG. 1 by the dashed box labeled as a transmit path 118. The transmit path 118 includes a transmit (Tx) chain 116 and all of the interconnects including through a corresponding radio transmit port 112, a feeder 114, an antenna port 111, up to a coupler (not shown) and a corresponding sub array 110 inside the antenna array 108. The transmit chain 116 includes components configured for frequency upconversion, digital predistortion and amplification of the RF signal. The coupler is configured to couple a portion of the signal power from the feeder 118 to a combiner 120 or a switch.

Figure 2:
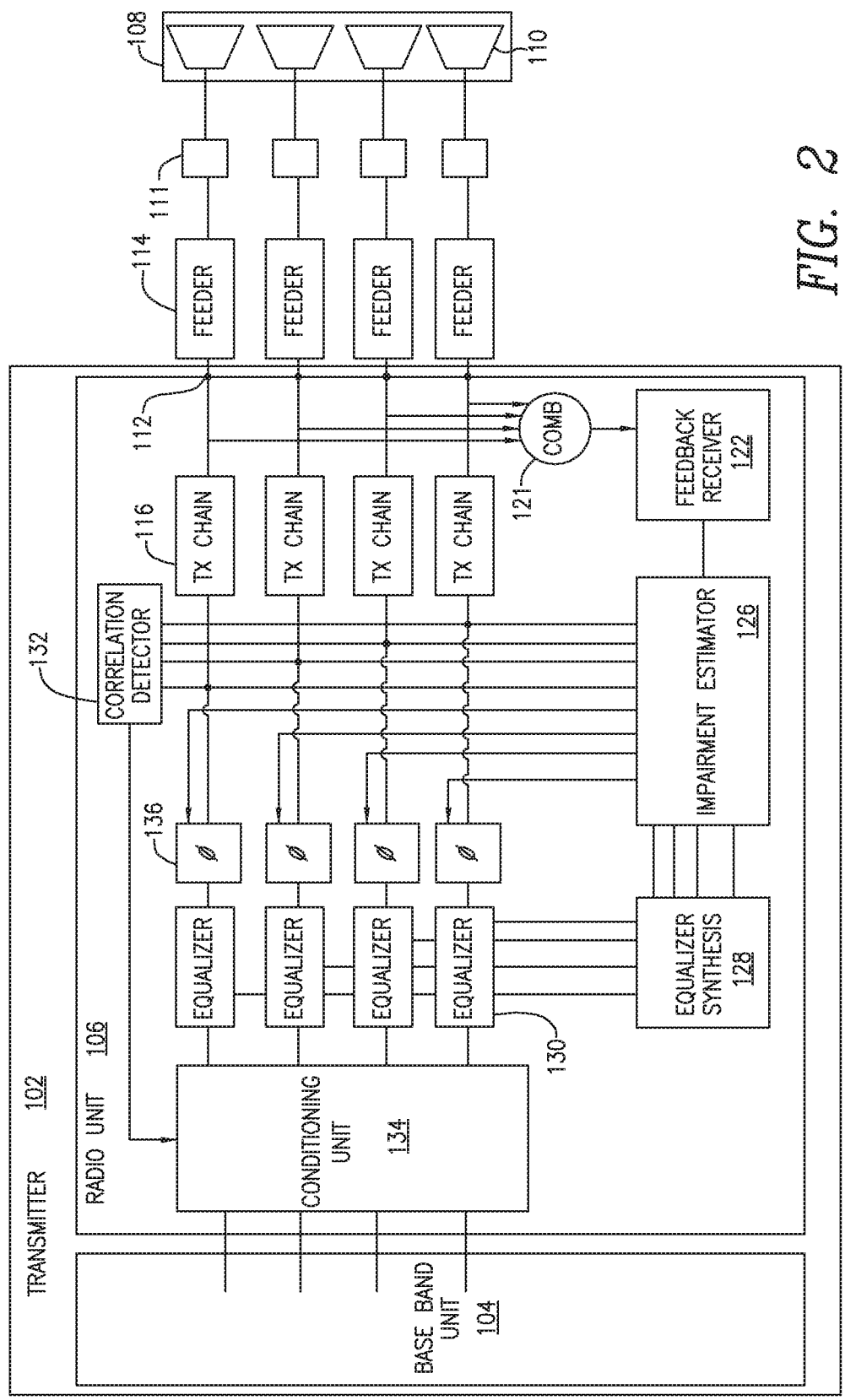
FIG. 2 is a block diagram of an alternative transmitter for phase impairment compensation.

In an alternative embodiment shown in FIG. 2, a coupler may instead be placed in each path after the transmit chain 116 but before the transmit port 112 to direct a portion of the signal power from the transmit chains to a combiner 121 or switch having an output coupled to the feedback receiver 122. The impairment estimation is then done on the signals at the output of the transmit chains 116. This may be beneficial when there is no feedback signal from the antennas 110 or to avoid the need to use a feedback signal. Thus, there are at least four alternative implementations: 1) combined transmit chain output, 2) combined antenna feedback signal, 3) switched transmit chain outputs, and 4) switched antenna feedback signals. In some embodiments, feedback from couplers after the antenna ports 112 can be used for full non-linear phase calibration, whereas feedback from couplers just after the transmit chains 116 can be used for fast linear phase calibration as described below.

In practice the transmit path 118, which includes the transmit chain, 116 may also include duplexers, combiners, diplexers, etc., such as would be appreciated by one skilled in the art. There is a one-to-one correspondence between a transmit chain and a transmit path; that is, each transmit path has only one transmit chain.

To perform antenna array calibration, the outbound traffic signals are coupled by respective couplers and combined (i.e., summed) by the combiner 120 to produce a feedback signal. The combiner 120 combines the outbound traffic signals from all of the subarrays 110 into a single feedback signal. This feedback signal is routed to a feedback receiver 122 through a corresponding radio calibration port 124 at the radio unit 106.

In one embodiment, the radio unit 106 is configured to convert baseband signals into radio frequency (RF) signals for transmission. The radio unit 106 includes the transmit chains 116, one for each transmit path 118. In some embodiments, the transmit chains 116 are the boundary between digital processing and analog processing in the base station 100, as each transmit chain 116 converts an outbound traffic signal from digital to analog. Each transmit chain 116 includes a number of analog components, such as one or more digital-to-analog converters, mixers, filters, power amplifiers, etc. These analog components in the transmit chains 116, together with the feeders 114 and other components along the analog portion of the transmit paths up to the antenna ports 111, generally incur linear phase and/or linear amplitude impairment to the outbound traffic signals. In one embodiment, significant non-linearities in the transmit path (such as the power amplifier) are typically addressed by non-linear pre-distortion methods. Thus, there are non-linear and linear impairments in the time domain. The non-linear time domain impairments are compensated by pre-distortion circuitry and are not addressed herein. Of note, there are linear and non-linear impairments in the time domain. The non-linear time domain impairments are addressed by the pre-distortion. As a result, only linear time domain impairments need to be addressed. The non-linear phase response that is shown in S104 of FIG. 5 below, is a non-linear phase response in the frequency domain. This is still a linear time domain impairment.

To calibrate and compensate for the linear impairment of phase and/or amplitude, normal outbound traffic signals in the transmit paths are simultaneously captured in the radio unit 106 before these signals enter the transmit chains 116. These captured signals are used as reference signals, each of which is an outbound traffic signal to be transmitted by one of the transmit chains 116 via one of the sub-arrays 110. The outbound traffic signals at the capture point have not been impaired by the analog components in the transmit paths, and therefore are suitable for serving as reference signals. The feedback signal, on the other hand, is formed after each outbound traffic signal has gone through the analog portion of the transmit path. Thus, the feedback signal is a sum of the impaired outbound traffic signals. The calibration method described herein uses the unimpaired reference signals and the impaired sum of the traffic signals to estimate the phase impairment in the transmit path and to thereby remove the phase impairment from the outbound traffic signals. In some cases, only the differences in the phase impairments of the transmit paths need to be removed from the outbound traffic signals to obtain good system performance.

The methods described herein are particularly suited to compensate for fast phase variations caused by impairments introduced by use of separate timing or clock components in each of the transmit chains 116, for example different radio frequency local oscillators, voltage controlled crystal oscillators, clock recovery phased locked loops, etc. The rapid nature of these impairments require correction at a fast rate, a requirement conventional solutions cannot easily meet because of their complexity and processing requirements. Operating in the time domain samples as described herein enables rate correction that is faster than the change in phase impairments in the transmit paths 118. In the following description, examples are provided where complex multipliers, time adjustment modules and/or magnitude adjustment modules are used to correct phase and/or magnitude impairments. However, the disclosure is not limited as such and other ways to correct for phase and magnitude impairments may be implemented in addition to (or instead of) the methods of correcting phase impairments described herein.

The feedback signal from the combiner 120 is sent to the feedback receiver 122, which down-converts and digitizes the feedback signal to produce a digitized feedback signal. The digitized feedback signal is transmitted to an impairment estimator 126 to be processed with the reference signals.

In one embodiment, the impairment estimator 126 aligns the feedback signal with the reference signals in time, and performs a de-convolution of the reference signals jointly with the feedback signal. The result of the de-convolution is an estimated impairment for each transmit path. As the effect of impairment is equivalent to convolving the reference signals with the impairment, the impairment may be calculated by de-convolving the reference signals with the impaired feedback signal. The de-convolution can be solved by direct or iterative methods.

Based on the estimated impairment from the impairment estimator 126, an equalizer synthesis unit 128 computes an approximate inverse to the impairment in the frequency range occupied by the outbound traffic signals. The equalizer synthesis unit 128 produces a set of equalizer taps representative of the approximate inverse to the impairment. The equalizer synthesis unit 128 then sets the tap values of the corresponding equalizers 130 according to the equalizer taps. In one embodiment, each equalizer 130 is a complex finite impulse response (FIR) filter with one or more taps (i.e., equalizer taps). The finite impulse response is an approximate inverse to the transfer function of impairment in the transmit path from the transmit chain 116 to the antenna port 111. As such, each outbound traffic signal processed by the equalizer 130 is pre-distorted such that the pre-distortion cancels out the impairment in the transmit path.

In one embodiment, the base station 100 also includes a correlation detection unit 132 to detect a degree of correlation between the outbound traffic signals. The correlation detection may be performed by a cross-correlation computation between each outbound traffic signal and all of the other outbound traffic signals. If the correlation between any pair of the outbound traffic signals exceeds a predetermined correlation threshold, the correlation detection unit 132 may activate a conditioning unit 134 on the transmit paths to condition the outbound traffic signals. The conditioning may be, for example, phase dithering of the signals in each transmit path sufficient to remove singularities in the equations to be solved that are described below. Other possibilities for conditioning exist. For example, U.S. patent application Ser. No. 13/677,781, published as U.S. Patent Application Publication No. 2014/0133470 A1, the contents of which are incorporated by reference herein, provides other examples of conditioning outbound traffic signals.

If the correlation is below the correlation threshold, the outbound traffic signals may bypass the conditioning unit 134, or may deactivate the conditioning unit 134 from performing signal conditioning. In one embodiment, the conditioning unit 134 conditions the outbound traffic signals before the outbound traffic signals enter the equalizers 130. The output of the equalizers 130 are input to a complex multiplier 136 to compensate for phase impairment.

In one embodiment, if the correlation of the outbound traffic signals exceeds the correlation threshold, then the outbound traffic signal phases and/or amplitudes may be varied slightly as a function of time. This amounts to wobbling the spatial antenna patterns slightly over time. The slight phase and/or amplitude variation reduces the correlation. The slight phase and/or amplitude variation is transparent to other network nodes and user equipment that are in communication with the base station 100, as these network nodes and user equipment can equalize and compensate for this slight variation.

In the general case where the outbound traffic signals are not correlated (e.g., not exceeding a predetermined correlation threshold), the calibration method described with reference to FIG. 1 is able to make use of actual traffic signals carrying live traffic for calibration, thus avoiding the injection of specially created calibration signals. Therefore, the error vector magnitude (EVM) of the outbound traffic signals is not degraded since the signals are not being interrupted by injected calibration signals. In addition, because the calibration method described herein has no or negligible impact on the outbound traffic signal EVM, antenna calibration can be performed on an ongoing basis while in service with minimal service impact. In the special case where the outbound traffic signals are correlated (e.g., exceeding a predetermined correlation threshold) as in beam-forming applications, the calibration method described herein provides a conditioning solution that has no or negligible impact on the outbound traffic signal EVM.

Although FIG. 1 shows that the calibration functions are performed entirely in the radio unit 106, some or all of the calibration functions can be performed in the baseband unit 104 of the base station 100. In some embodiments, the calibration functions may be performed in the radio unit 106, the baseband unit 104, and/or other portions of the base station 100. In other words, the disclosure is not limited solely to the specific example of FIG. 1 as described above.

In one embodiment, the impairment estimation and equalization are performed in a continuous loop, where the feedback signal and reference signals are continuously captured over time and are continuously used to refine the equalizer taps. The computation of impairment estimation and equalization can be performed offline or in real-time. For example, a block of reference signals captured over a period of time may be used in offline processing in order to obtain an accurate impairment estimation and equalization. Alternatively, real-time processing may be more responsive to changes in operating conditions. In some embodiments, the base station 100 may dynamically switch between offline and real-time processing based on the current operating conditions.

In one embodiment, the impairment estimation is performed by de-convolution of the reference signals and the feedback signal. As described above with reference to FIG. 1, the de-convolution may be computed by the impairment estimator 126, and the de-convolution result is the estimated impairment. This de-convolution can be solved directly by division in the frequency domain, if there is only one transmit path, or by iterative de-convolution algorithms such as the iterative least mean squares (LMS) algorithm when there are multiple transmit paths. Computation of the de-convolution may be performed by a general-purpose processor executing de-convolution, a special-purpose hardware device (e.g., an Application-Specific Integrated Circuit (ASIC)), firmware, or a combination of the above. The estimated impairment can be fed into the equalizer synthesis unit 128 to compute an approximate inverse of the impairment for use in the equalizer 130.

In one embodiment, for the example of FIG. 1, four or more blocks of time domain data are captured for each of the reference signals and the feedback signal, where each block of data contains a time series of the signal sampled over a period of time. These blocks of data are converted to the frequency domain. For each frequency bin in the frequency domain, each block of captured data can be used to construct a linear equation having four unknown impairments. Thus, the four or more blocks of captured data can be used to construct a linear system of four or more linear equations having the four unknown impairments. With these four or more equations, the impairment estimator 126 can compute a matrix inverse (in the case of four equations) or pseudo-inverse (in the case of more than four equations) to solve for the four impairment unknowns per frequency bin. Using more than four equations may average out the noise on the feedback signal and thereby improve the signal-to-noise ratio. The frequency domain solutions may be converted back to the time domain to obtain the estimated impairment.

Thus, as described above, calibration as a function of frequency using traffic signals involves solving for the impulse response of each of the transmit chains and synthesizing an equalizer to compensate for impairment in the transmit path. This requires observation of a feedback signal over some time and using some involved computations which may limit the update rate of the phase/magnitude correction of fast impulse response changes as a function of time. This may be the case where separate radio frequency local oscillators (RFLO) or voltage controlled crystal oscillators (VCXO) or clock recovery phase locked loops (PLLs) exist between transmit paths. In such cases, the phase between the transmit paths can drift relatively fast and the calibration phase calculation and compensation has to be done faster than the phase change.

Figure 3:
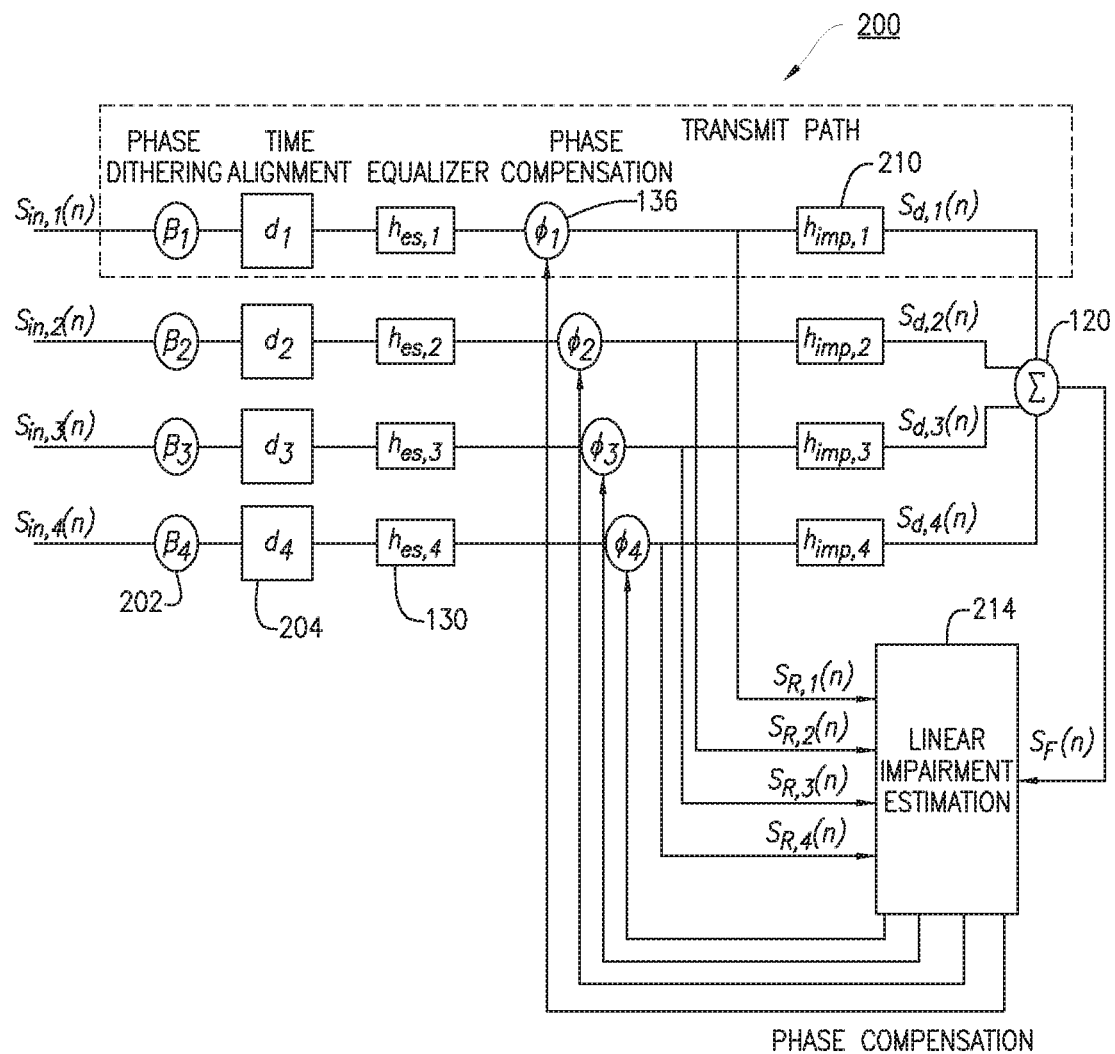
FIG. 3 is a higher level block diagram of an apparatus for phase impairment compensation constructed in accordance with principles described herein.

A high-level calibration block diagram 200 for phase impairment compensation is shown in FIG. 3. The block diagram of FIG. 3 is another way of expressing the relationships among the elements of FIG. 1, i.e., another way of depicting the block diagram of FIG. 1. As with FIG. 1, the embodiment of FIG. 3 provide phase impairment compensation that is faster than known methods. The transmit signals after channel filtering are denoted by $S_{in,p}(n)$, where $p=1, 2, \ldots, P$ is the transmit filter branch index, P is the total number of filter branches (transmitters) and $n=\{0, 1, 2, \ldots\}$ is the sample index.

Each transmit filter branch signal is passed through a phase dithering block 202, time alignment module 204, an equalizer 130, a complex multiplier 136 for phase adjustment, and impairment $h_{imp,p}$ 210. The impairment can be caused by local oscillator phase drift, cavity filters, digital and analog processing functions and cables, etc. Each transmit signal also undergoes other processing such as upsampling, multicarrier combining, upconversion, pre-distortion and power amplification. The embodiment of FIG. 2 allows for the alignment of signals in each transmit path relative to one another, so that, for example, each transmit path signal undergoes the same phase delay. This can be achieved by applying different phases in the complex multipliers 136, different time alignments of time alignment modules 204 and/or by selecting one transmit path signal as a reference and aligning the other transmit path signals to the reference.

The correction of the phase compensation $\phi_p$ can be accomplished by the complex multipliers 136 in the transmit paths. It is also possible to include the phase compensation $\phi_p$ in the equalizers 130 where all the taps are multiplied by a complex value representing the phase change $\phi_p$. The phase compensation $\phi_p$ is obtained from estimates of the phase impairment $\varphi_p$.

The impairment signals are coupled in the antenna as $S_{d,p}(n)$ and then combined at combiner 120 in the antenna to form a calibration feedback signal $S_F(n)$. The reference signals $S_{R,P}(n)$ can be tapped off before or after the equalizer. In FIG. 3, the reference signals are tapped after the equalizer. The reference signals as well as the combined feedback signal are used to determine $h'_{imp,p}$, which is an estimate of the impairment impulse response $h_{imp,p}$ as part of the existing calibration method. The impairment estimation $h'_{imp,p}$ is then used to calculate the differential delay ($d_p$) and equalizer taps $h_{es,p}$. The required delay $d_p$ and equalizer taps $h_{es,p}$ to calibrate the transmit branches are applied to the time alignment blocks and equalizer blocks respectively. The equalizer is also able to correct for some of the differential delay.

The fast phase variations are compensated by multiplication by phase compensation $\phi_p$ in the multipliers 136. The values of the phase compensation $\phi_p$ may be determined as follows.

A block of samples of each reference signal and feedback signal is selected. The reference signals are convolved or equalized with the estimated impairment impulse response $h'_{imp,p}$ determined as described above to give the modified reference signals $S'_{R,p}(n)$. The linear phase estimation unit 214 computes the modified reference signals according to:

$$S'_{R,p}(q_a) = S_{R,p}(Q_a) * h'_{imp,p}$$

where the index vectors $Q_a$ and $q_a$ are:

$$Q_a = \{aN_{eq}, aN_{eq}+1, \ldots, (a+1)N_{eq}-1+2L_h\}$$

$$q_a(aN_{eq}L_h, L_h aN_{eq}+1, \ldots, L_h aN_{eq}N_{eq}-1)$$

with $a=\{0, \ldots, N_{ave}-1\}$ an averaging index and $N_{ave}$ is the number of averages and $L_h$ is the length of $h'_{imp,p}$ and where $N_{eq}$ is the number of equations.

The linear phase estimation unite 214 solves a system of linear equations as follows:

$$R_a H_a = F_a$$

where $$R_a = \begin{pmatrix} S'_{R,1,a}(0) & S'_{R,2,a}(0) & \cdots & S'_{R,P,a}(0) \\ S'_{R,1,a}(1) & S'_{R,2,a}(1) & \cdots & S'_{R,P,a}(1) \\ \vdots & \ddots & \ddots & \vdots \\ S'_{R,1,a}(N_{eq}-1) & S'_{R,2,a}(N_{eq}-1) & \cdots & S'_{R,P,a}(N_{eq}-1) \end{pmatrix}$$

$$H_a = \begin{pmatrix} A_1 e^{j\psi_1} \\ A_2 e^{j\psi_2} \\ \vdots \\ A_P e^{j\psi_P} \end{pmatrix} \text{ and } F_a = \begin{pmatrix} S_{F,a}(0) \\ S_{F,a}(1) \\ \vdots \\ S_{F,a}(N_{eq}-1) \end{pmatrix}$$

This is an overdetermined system of linear equations where Neq>P. There are P unknown amplitude and phase values in the H impairment matrix.

The H matrix can be determined with:

$$H = R^+ F$$

where $R^+$ is a pseudo inverse. The Conjugate Gradient Method (CGM) can also be used to find H by doing the following matrix multiplications:

$$D = R^H R$$

$$E = R^H F^T$$

then $$H = CGM(D, E)$$

Magnitude calculations are omitted for the rest of this description as the calibration will be described for phase only. Amplitude calibration can be performed using the same procedure. The phase for each transmit path p and value a is then:

$$\varphi_p(a) = a \tan(H_a(p))$$

The phase will be a noisy estimate due to the noise from the correlated signals as well as other system noise. In order to improve the signal to noise ratio of the phase estimate an average will be done over $N_{ave}$ averages:

$$\phi_p = \frac{1}{N_{ave}} \sum_{a=0}^{N_{ave}-1} \varphi'_p(a)$$

The value of $N_{ave}$ depends on the phase accuracy requirements. Note that the amount of phase dithering by components 202, will depend on the number of equations to solve and number of averages taken.

Figure 4:
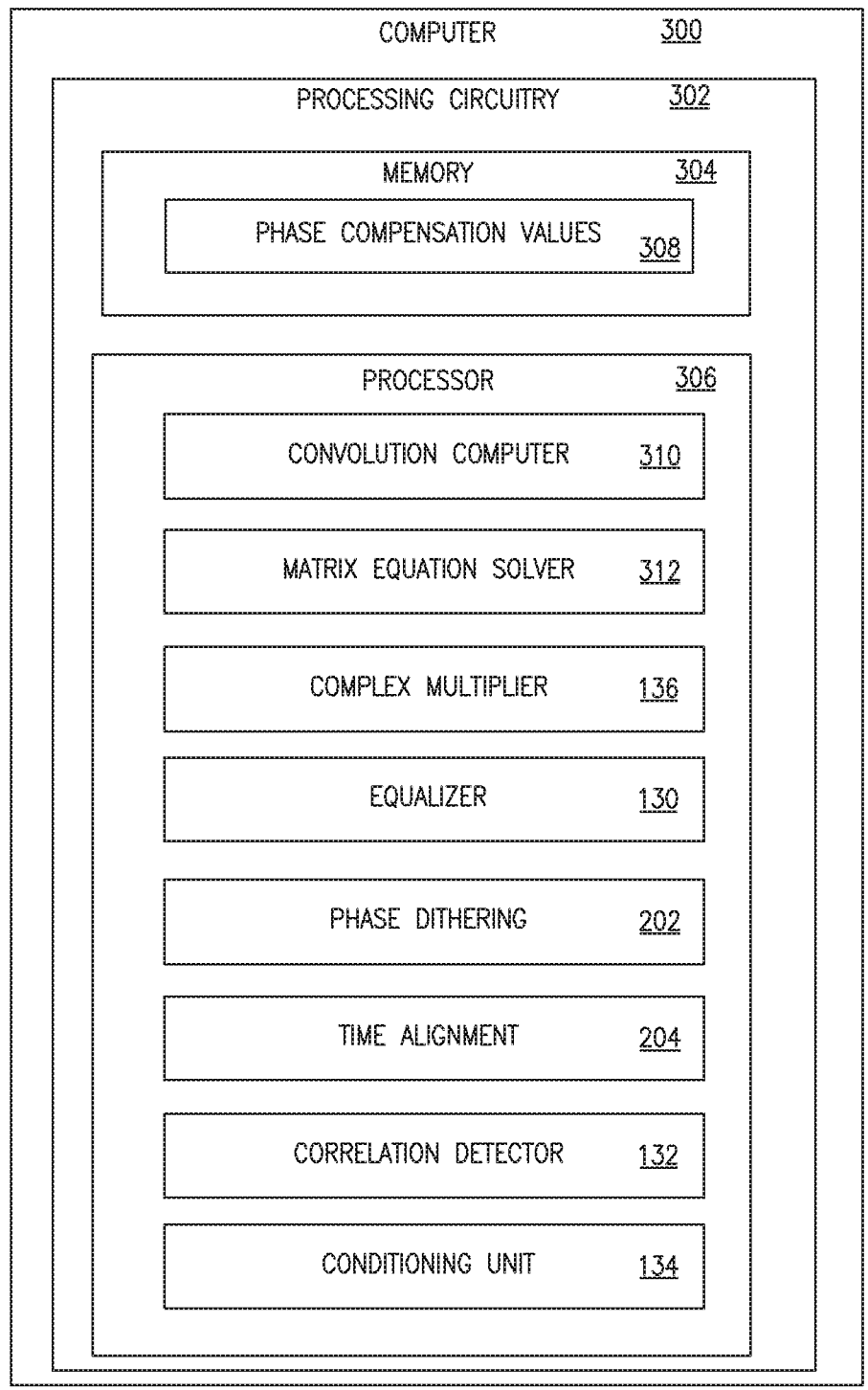
FIG. 4 is a block diagram of a computer for computing phase impairment compensation values, time alignment, phase dithering, correlation, and conditioning according to principles described herein.

FIG. 4 is a block diagram of one embodiment of a computer 300 for determining a phase compensation value for calibration of phase impairment in transmit paths of the base station 100. In one embodiment, the computer 300 is part of the transmitter 102, implementing one or more of the functions described herein. The computer 300 has processing circuitry 302. In some embodiments, the processing circuitry may include a memory 304 and processor 306 containing instructions which, when executed by the processor 306, configure processor 306 to perform the one or more functions described herein. In addition to a traditional processor and memory, processing circuitry 302 may comprise integrated circuitry for processing and/or control, e.g., one or more processors and/or processor cores and/or FPGAs (Field Programmable Gate Array) and/or ASICs (Application Specific Integrated Circuitry). Processing circuitry 302 may comprise and/or be connected to and/or be adapted for accessing (e.g., writing to and/or reading from) memory 304, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 304 may be configured to store code executable by control circuitry and/or other data, e.g., data pertaining to communication, e.g., configuration and/or address data of nodes, etc. Processing circuitry 302 may be adapted to control any of the methods described herein and/or to cause such methods to be performed, e.g., by the computer 300. Corresponding instructions may be stored in the memory 304, which may be readable and/or readably connected to the processing circuitry 306. In other words, processing circuitry 302 may include a controller, which may comprise a microprocessor and/or microcontroller and/or FPGA (Field-Programmable Gate Array) device and/or ASIC (Application Specific Integrated Circuit) device. It may be considered that processing circuitry 302 includes or may be connected or connectable to memory, which may be configured to be accessible for reading and/or writing by the controller and/or processing circuitry 302.

The memory 304 is configured to store phase compensation values 308 computed by the processor 306. The processor 306 is programmed to implement a convolution computation 310 to determine an impairment impulse response for at least one of the transmit paths. The processor 306 may also be programmed to perform matrix equation solving 312 via one of a pseudoinverse of a matrix of modified reference signals or via a conjugate gradient method, in order to obtain an impairment vector, H, from which phase compensation values can be determined. The complex multipliers 126 for multiplying outbound traffic signals can also be implemented by the processor 306. The processor 306 can also be programmed to perform the phase dithering 202, the time alignment 204, equalization 130, the correlation detection 132 and the conditioning 134.

Figure 5:
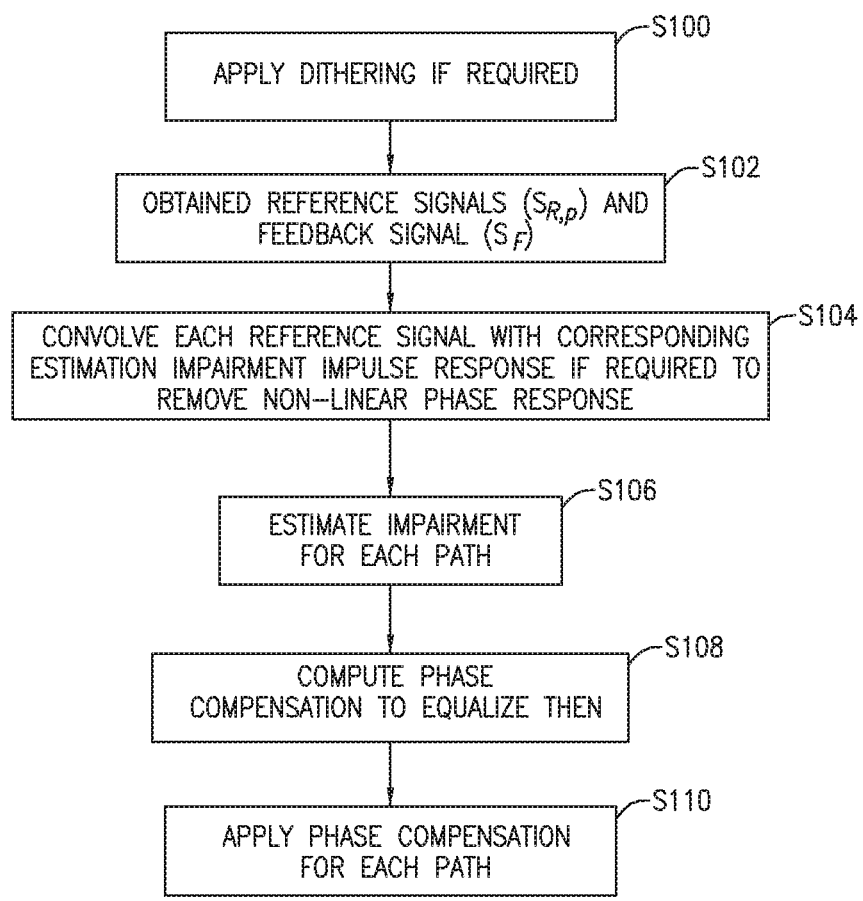
FIG. 5 is a flowchart of an exemplary process for performing phase impairment compensation of transmit paths that feed an antenna array.

FIG. 5 is a flowchart of an exemplary process for phase compensation in a transmitter coupled to an antenna array of multiple antennas. The process includes applying dithering to outbound traffic signals, if required (block S100). Reference signals are obtained from the outbound traffic signals and a feedback signal is obtained from combining the outbound traffic signals after they are impaired by the transmit paths (block S102). Each of the reference signals is convolved with a corresponding estimation impairment impulse response if required to remove a non-linear phase response (block S104). Examples of other arrangements to deal with non-linear frequency domain impairments can be found in U.S. Pat. No. 9,094,254, the entire contents of which is incorporated herein. The impairment impulse response may be determined as explained above with reference to FIG. 1. An estimated phase impairment is determined for each transmit path (block S106). A phase compensation value is determined for each transmit path from the estimated phase impairments (block S108). The phase compensations are applied to each transmit path (block S110).

Figure 6:
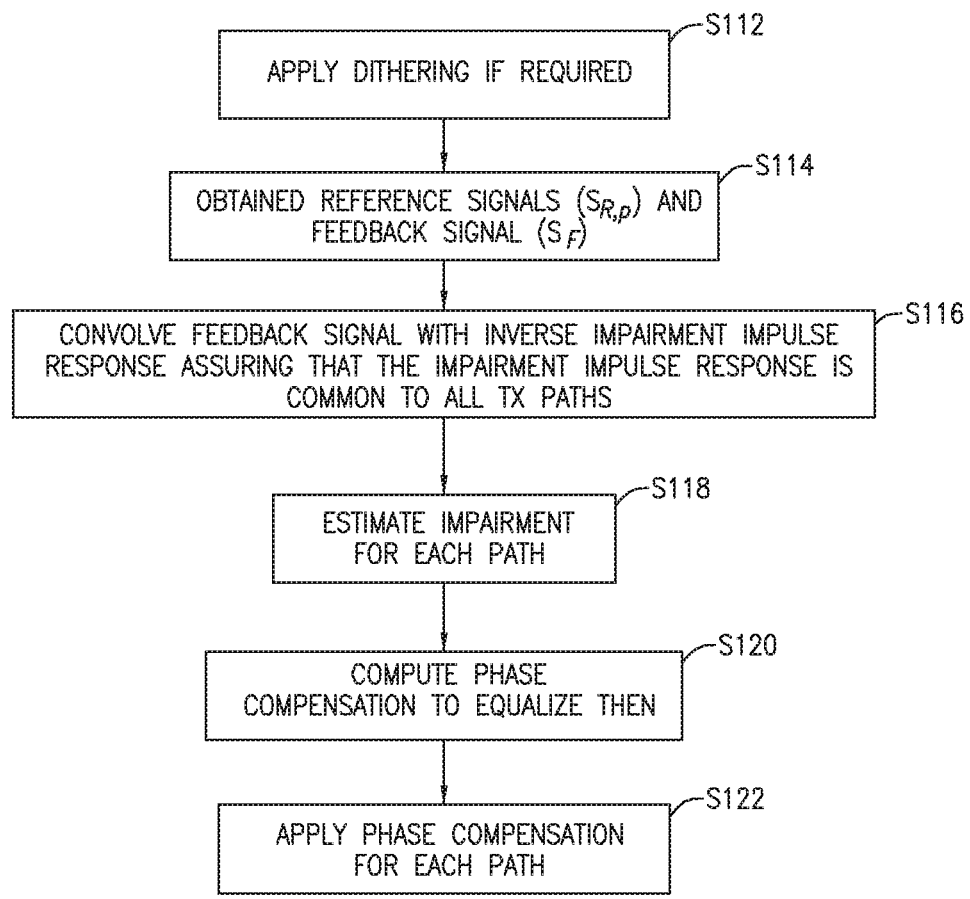
FIG. 6 is a flowchart of an exemplary process for performing phase impairment compensation assuming that an impairment impulse response is common to all transmit paths.

FIG. 6 is a flowchart of an exemplary process for phase compensation in a transmitter that is similar to the flowchart of FIG. 4, except for the convolution step (block S116). The process includes applying dithering to outbound traffic signals, if required (block S102). Reference signals are obtained from the outbound traffic signals and a feedback signal is obtained from combining the outbound traffic signals after they are impaired by the transmit paths (block S114). In the process of FIG. 5, the feedback signal is convolved with an inverse impairment impulse response assuming that the impairment impulse response is common to all transmit paths (block S116). An estimated phase impairment is determined for each transmit path (block S118). A phase compensation value is determined for each transmit path from the estimated phase impairments (block S120). The phase compensations are applied to each transmit path (block S122).

Figure 7:
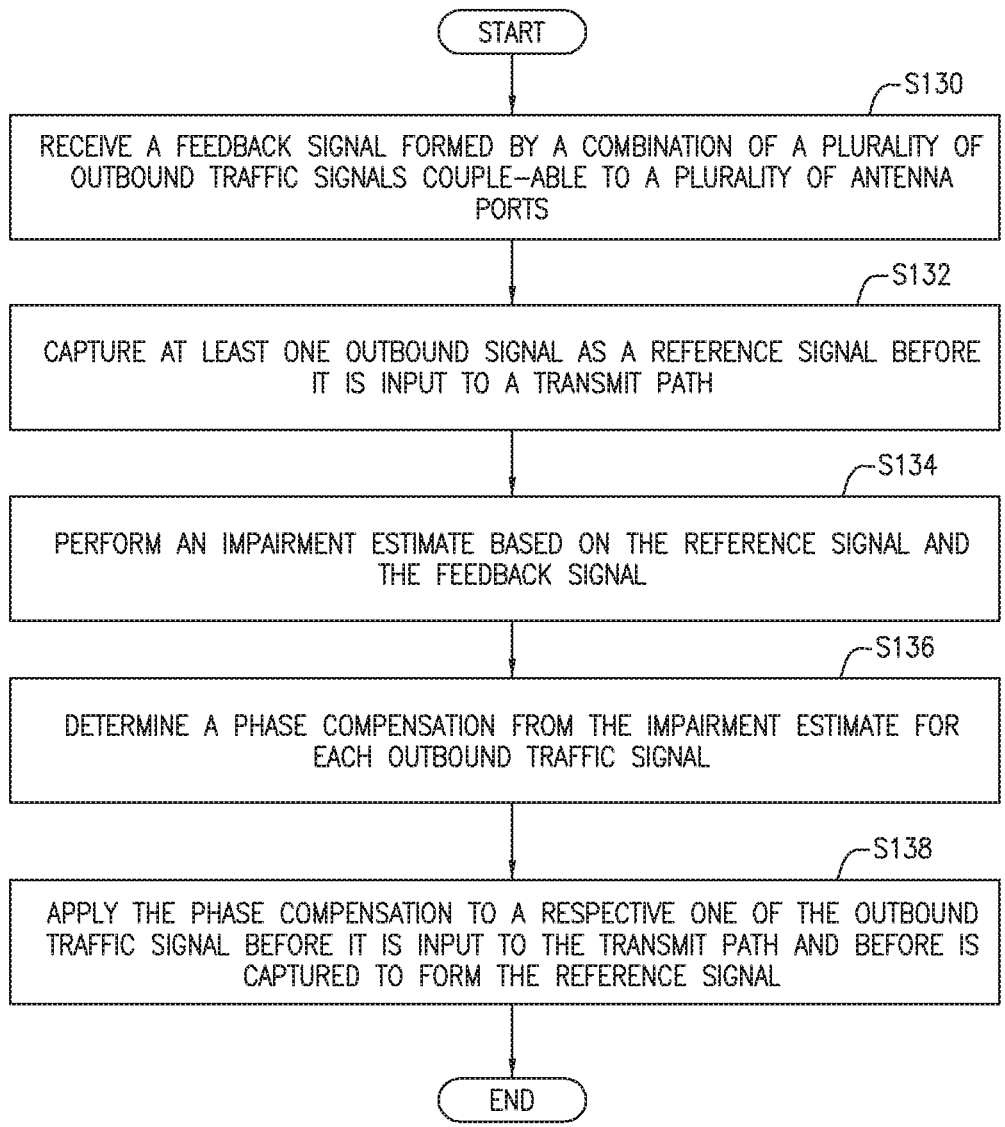
FIG. 7 is a flowchart of an exemplary process for performing phase impairment compensation of transmit paths that feed an antenna array.

FIG. 7 is a flowchart of an exemplary process to compensate for signal phase impairment in transmit paths in a transmitter. The process includes receiving a feedback signal formed by a combination of a plurality of outbound traffic signals couple-able to a plurality of antenna ports 111 (block S130). The process also includes capturing at least one outbound signal as a reference signal before it is input to a transmit path 118 (block S132). Phase impairment is estimated based on the reference signal and the feedback signal (block S134). A phase compensation value is determined from the phase impairment estimator 126 for each outbound traffic signal (block S136). The phase compensation value is then applied by a multiplier 136 to a respective one of the outbound traffic signal before it is input to the transmit path 118 and before it is captured to form the reference signal.

An advantage of the phase adjustments described above is that the estimation of phase differences between transmit chains can be performed in a small amount of time to achieve correction of time variations between the transmit chains. The method of phase compensation described above can be used under a large range of system conditions such as wide bandwidth, multiple carriers, and multiple access technologies. In addition these methods accommodate highly correlated transmit signals.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A time domain calibration method to compensate for signal impairment in transmit paths in a transmitter configured to drive an antenna array, the method comprising:
    receiving a feedback signal formed from a combination of a plurality of outbound signals couple-able to a plurality of antenna ports;
    capturing at least one outbound signal as a reference signal before the at least one outbound signal is input to a transmit path;
    performing an impairment estimate based on the at least one reference signal and the feedback signal; wherein performing the impairment estimate includes implementing a conjugate gradient method to produce an impairment vector, H, the impairment vector H usable to determine the phase compensation;
    determining a phase compensation from the impairment estimate for each of the at least one outbound traffic signal; and
    applying the phase compensation to a respective one of the at least one outbound traffic signal before the at least one outbound traffic signal is input to the transmit path and before the at least one outbound traffic signal is captured to form the at least one reference signal.

2. The method of claim 1, wherein performing the impairment estimate includes computing a pseudoinverse of a matrix whose elements are based on the at least one reference signal to produce an impairment vector, H, the impairment vector H usable to determine the phase compensation.

3. The method of claim 1, wherein deriving the phase compensation includes computing a phase of each element of an impairment vector, H, the impairment vector H usable to determine the phase compensation.

4. The method of claim 3, wherein deriving the phase compensation includes computing an average of the computed phases of elements of the impairment vector, H.

5. The method of claim 1, wherein the phase compensation is applied by complex multiplication.

6. The method of claim 1, further comprising:
    detecting a correlation between reference signals; and
    conditioning the outbound traffic signals when the correlation exceeds a correlation threshold.

7. The method of claim 6, wherein applying the phase compensation is performed after the conditioning and before detecting the correlation.

8. The method of claim 1, wherein the steps of capturing, performing, deriving and applying are performed in a radio unit of a base station.

9. The method of claim 1, further comprising:
    estimating an impairment impulse response in each transmit path; and
    performing a convolution of a reference signal with the estimated impairment impulse response of a corresponding transmit path to reduce a non-linear phase response.

10. The method of claim 1, further comprising:
    estimating an impairment impulse response; and
    performing a convolution of a feedback signal with an inverse of the estimated impairment impulse response to reduce a non-linear phase response.

11. A transmitter configured to compensate for signal impairment in transmit paths of the transmitter that couple outbound traffic signals to antennas of an antenna array, the compensation being performed in a time domain, the transmitter comprising:
    a plurality of transmit paths, each transmit path coupling an outbound traffic signal to a port of an antenna element of the antenna array;
    a combiner switch configured to combine signals output from the transmit paths to form a feedback signal;
    an impairment estimator unit configured to produce a phase compensation value based on at least one reference signal and the feedback signal, the at least one reference signal being an outbound traffic signal after being multiplied by the phase compensation value and wherein the impairment estimator unit implements a conjugate gradient method to produce an impairment vector, H, the impairment vector H usable to determine the phase compensation value; and
    at least one multiplier device configured to multiply each of at least one outbound traffic signal by a phase compensation value before the at least one outbound traffic signal is coupled to a respective transmit path.

12. The transmitter of claim 11, wherein the impairment estimator unit computes a pseudoinverse of a matrix whose elements are based on the at least one reference signal to produce an impairment vector, H, the impairment vector H usable to determine the phase compensation value.

13. The transmitter of claim 11, wherein producing a phase compensation value includes computing a phase of an element of an impairment vector, H, the impairment vector H usable to determine the phase compensation value.

14. The transmitter of claim 11, further comprising:
    a radio correlator configured to detect a correlation between reference signals; and
    a conditioner tool configured to condition the outbound traffic signals when the correlation exceeds a correlation threshold.

15. The transmitter of claim 14, wherein the multiplication of a reference signal by a phase compensation value occurs after the conditioning but before the detecting.

16. A base station configured to compensate for signal phase impairment in transmit paths feeding an array of antenna elements, the compensation being performed in a time domain, the base station comprising:
    a combiner switch configured to combine signals output from the transmit paths to form a feedback signal;
    an impairment estimator unit configured to receive the feedback signal and outbound traffic signals and to determine a phase compensation value for each impairment path wherein the impairment estimator unit implements a conjugate gradient method to produce an impairment vector, H, the impairment vector H usable to determine the phase compensation value; and
    a multiplier device for each transmit path, the multipliers device configured to multiply the outbound traffic signals by respective phase compensation values.

17. The base station of claim 16, wherein the multiplication occurs before the outbound traffic signals are received by the impairment estimator unit.

18. The base station of claim 16, wherein the impairment estimator unit computes a pseudoinverse of a matrix whose elements are based on the at least one reference signal to produce an impairment vector, H, the impairment vector H usable to determine the phase compensation value.

19. The base station of claim 16, wherein the impairment estimator unit implements a conjugate gradient method to produce an impairment vector, H, the impairment vector H usable to determine the phase compensation value.

20. The base station of claim 16, wherein producing a phase compensation value includes computing a phase of an element of an impairment vector, H, the impairment vector H usable to determine the phase compensation value.

21. The base station of claim 16, further comprising:
   a radio correlator configured to detect a correlation between reference signals; and
   a conditioner tool configured to condition the outbound traffic signals when the correlation exceeds a correlation threshold.

22. The base station of claim 21, wherein the multiplication of a reference signal by a phase compensation value occurs after the conditioning but before the detecting.

* * * * *